United States Patent [19]

Lehureau

[11] Patent Number: 5,347,380

[45] Date of Patent: Sep. 13, 1994

[54] LIQUID CRYSTAL OPTICAL POLARIZATION SEPARATOR WITH PARRALLEL ALIGNMENT ON ONE SUBSTRATE, PERPENDICULAR ON OTHER

[75] Inventor: Jean-Claude Lehureau, Des Bois, France

[73] Assignee: Thomson-CSF, Puteaux, France

[21] Appl. No.: 989,365

[22] Filed: Dec. 11, 1992

[30] Foreign Application Priority Data

Dec. 20, 1991 [FR] France .................... 91 15900

[51] Int. Cl.$^5$ .................... G02F 1/13; G02F 1/1337; G02B 5/30
[52] U.S. Cl. .................... 359/57; 359/75; 359/48; 359/488
[58] Field of Search .................... 359/37, 39, 40, 41, 359/48, 63, 75, 99, 102, 483, 487, 488, 492

[56] References Cited

U.S. PATENT DOCUMENTS

| | | | |
|---|---|---|---|
| 3,854,793 | 12/1974 | Kahn | 359/73 |
| 4,097,128 | 6/1978 | Matsumoto et al. | 359/93 |
| 4,114,990 | 9/1978 | Mash et al. | 359/93 |
| 4,564,266 | 1/1986 | Durand et al. | 359/102 |
| 4,813,771 | 10/1987 | Handschy et al. | 359/39 |
| 4,913,529 | 5/1990 | Goldenberg et al. | 359/49 |
| 5,042,925 | 8/1991 | Broer et al. | 359/40 |
| 5,134,516 | 7/1992 | Lehureau et al. | 359/301 |
| 5,229,874 | 7/1993 | Lehureau et al. | 359/64 |
| 5,272,551 | 12/1993 | Lehureau et al. | 359/19 |

FOREIGN PATENT DOCUMENTS

| | | |
|---|---|---|
| 0134049 | 3/1985 | European Pat. Off. |
| 0428213 | 5/1991 | European Pat. Off. |
| 0152212 | 11/1981 | Fed. Rep. of Germany |
| 0113032 | 5/1986 | Japan |
| 3223811 | 10/1991 | Japan |
| 2194071 | 2/1988 | United Kingdom |

Primary Examiner—William L. Sikes
Assistant Examiner—Kenneth Parker
Attorney, Agent, or Firm—Oblon, Spivak, McClelland, Maier & Neustadt

[57] ABSTRACT

A polarization separator including a nematic liquid crystal (3) trapped between two transparent slides (1 and 2). The slide faces in contact with the liquid crystal are treated so that the liquid crystal molecules in contact with the faces are, for one of the faces (1) parallel to the face and, for the other face (2) perpendicular to the face. An incident light beam containing P polarization and S polarization is received at an oblique angle, and the directrix rotates the S polarization state as the light propagates through the device. The element is employed in a display system as a polarized light source.

10 Claims, 4 Drawing Sheets

FIG. 4 a
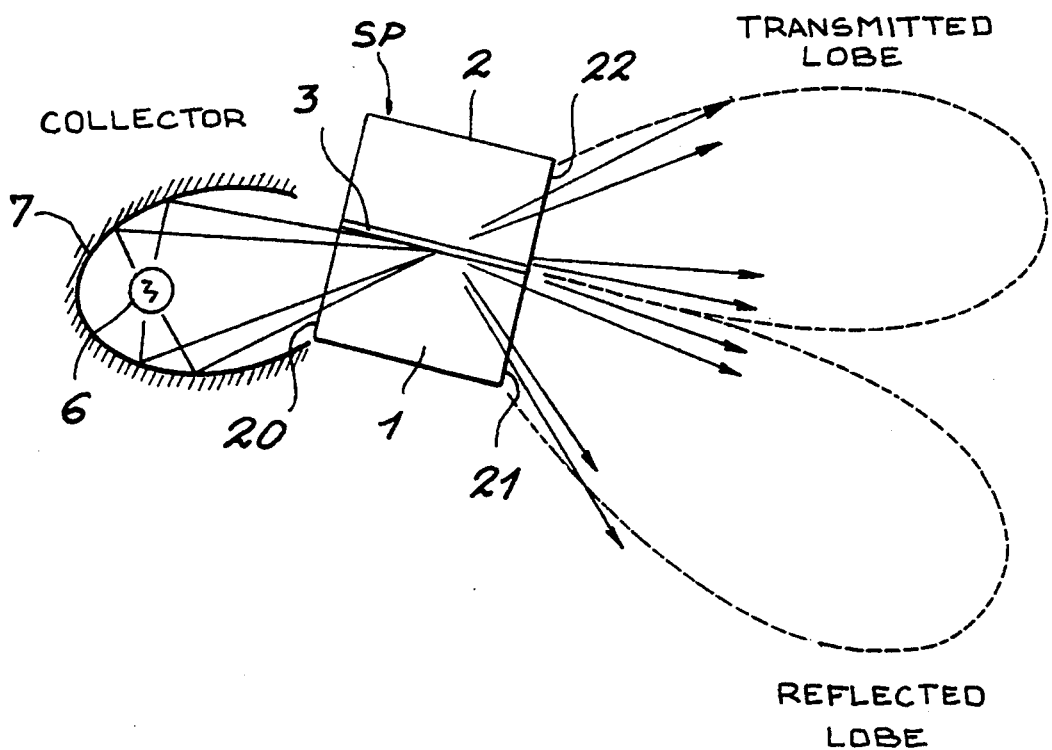
FIG. 4 b
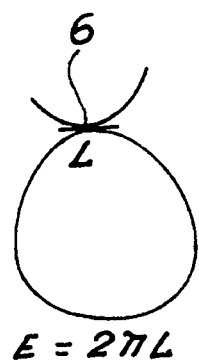
$E = 2\pi L$
FIG. 4 c
$$E' = \int_{i_0}^{90°} nL'\cos i\, di$$
Ar sin $n_0/n_e$

LIQUID CRYSTAL OPTICAL POLARIZATION SEPARATOR WITH PARRALLEL ALIGNMENT ON ONE SUBSTRATE, PERPENDICULAR ON OTHER

BACKGROUND OF THE INVENTION

The invention is an optical polarization separator and its use in a display system. In particular, the device according to the invention separates the two polarizations in an unpolarized light beam and, in a preferred embodiment, transmits them to an electro-optical display device such as a liquid crystal screen.

The principle of retrieving the unused source polarization, separating it, rotating it and then adding it to the direct polarization has been described in many patents and publications. The polarization is generally separated by reflection/transmission on a multilayer dielectric (using the Brewster angle) or by Bragg reflection of a circularly polarized component on a chiral structure. However, these separators are limited by the acceptable aperture and wavelength.

Rotation for recombination is generally done by a set of mirrors or a twisted nematic structure. Recombination generally requires a large number of dioptric systems and the efficiency is far from the theoretical value of 2. In addition, the polarization quality is inadequate and a last, conventional polarizer must be introduced to obtain satisfactory image contrast.

Moreover, systems known to the prior art are bulky and heavy. The device according to the invention is smaller and lighter due to the small number of efficient dioptric systems it requires.

SUMMARY OF THE INVENTION

The invention is, therefore, an optical polarization separator which includes a nematic liquid crystal element trapped between a first transparent glass slide and a second transparent glass slide, the face of one of the slides in contact with the liquid crystal being treated so that the liquid crystal molecules in contact with this face lie parallel to the face, the face of the other slide in contact with the liquid crystal being treated so that the liquid crystal molecules in contact with this face lie perpendicular to it.

The invention is also a display system embodying the polarization separator and including:
 a light source generating an unpolarized light beam;
 the polarization separator, to which the unpolarized light beam is applied and which produces two beams of light polarized in the same direction;
 a light modulator, to which the polarized light beams are applied and which modulates the intensity of these beams.

BRIEF DESCRIPTION OF THE DRAWINGS

The various purposes and characteristics of the invention will become clearer upon reading the following description, referring to the appended figures of which:

FIG. 4 represents an example of a display system according to the invention;

DETAILED DESCRIPTION OF THE INVENTION

Figure 1:
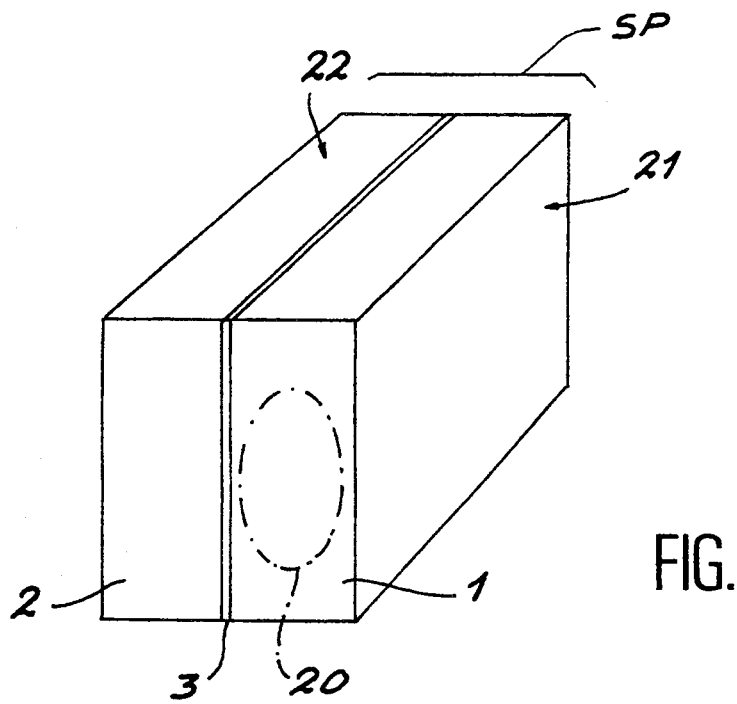
FIGS. 1 to 3 represent a polarization separator according to the invention.

We shall, firstly, describe an example of a polarization separator according to the invention. As indicated in FIG. 1, separator SP includes two transparent slides 1 and 2 between which a liquid crystal layer 3 is trapped. For example, the light beam enters the device via face 20 of slide 2 and exits, as will be seen later, via faces 21 and 22 of slides 1 and 2. The refractive indices of slides 1 and 2 are, for example, $n = 1.65$. The refractive indices of the liquid crystal are, for example, $n_o = 1.5$ for the ordinary index and $n_e = 1.65$ for the extraordinary index. One of the liquid crystal indices, for example the extraordinary index, is virtually equal to the index of slide 1.

A layer of polyimide material 4 and 5 (FIG. 2) is applied to the faces of slides 1 and 2 using a technique known to the prior art. According to the invention, after deposit of layer 4, slide 1 is subjected to a treatment, such as rubbing, in a predetermined direction, so that, in the assembled separator, the molecules of liquid crystal 3 in contact with layer 4 will lie parallel to the plane of layer 4 and in the above-mentioned predetermined direction which is the rubbing direction.

Using another technique known to the prior art, layer 5 is treated by dipping in a polysilane solution and stoving. The liquid crystal molecules in contact with layer 5 are then perpendicular to the plane of layer 5.

Between slides 1 and 2, the arrangement of the liquid crystal molecules is therefore such that if we examine the change in the molecule positions from slide 2 towards slide 1, they are firstly perpendicular to slide 2 and then become progressively more and more inclined until those in contact with layer 4 are parallel to the plane of slide 1.

The direction in which the molecules tilt can be determined by slight misalignment of the surface as is done in the prior art for all twisted nematic structures. This misalignment of "pretilt" can be selected by selecting the rubbing direction.

Figure 2:
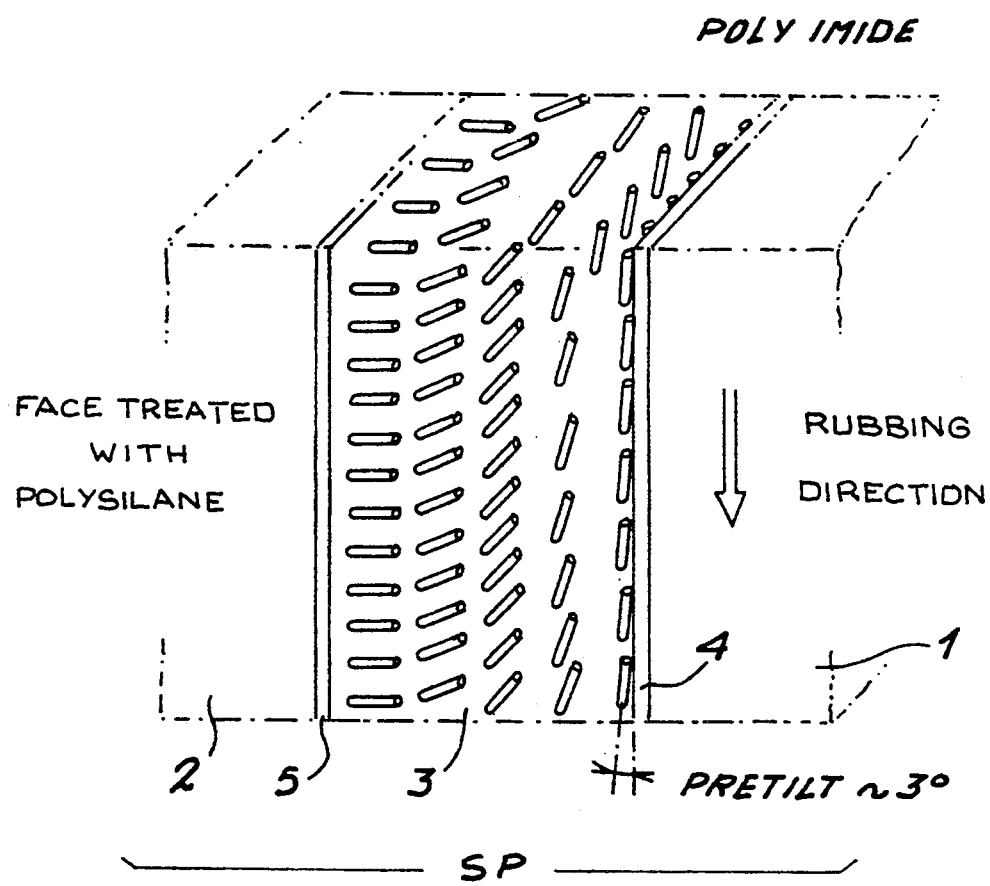
Figure 3:
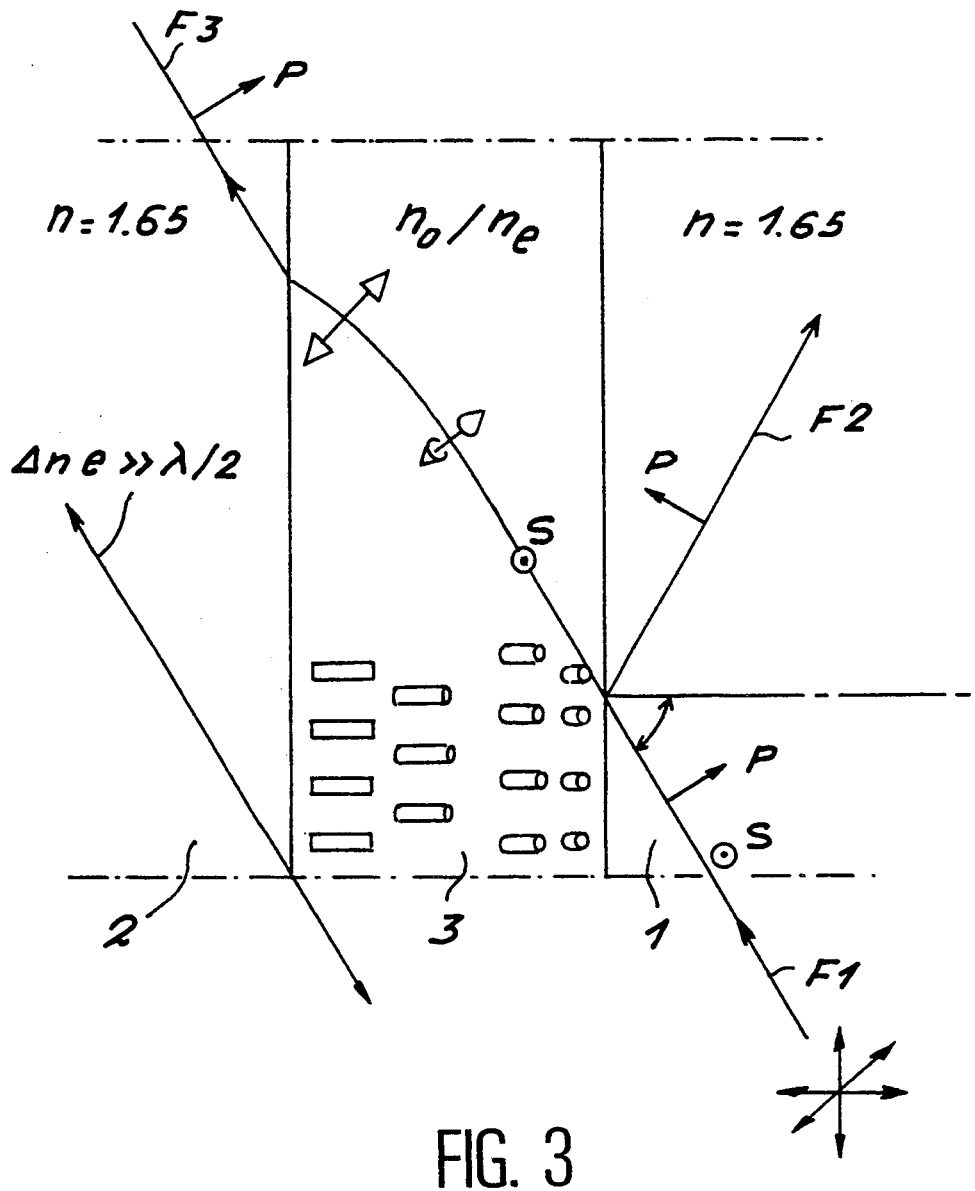

FIG. 2 describes one mode of operation of separator SP according to the invention. To facilitate the description, it is assumed that at least slide 1 is thick and that the beam F1 to be processed enters the device via the edge (face 20) of slide 1. In addition, there is a large difference between the liquid crystal ordinary and extraordinary indices. Moreover, one of these indices is virtually equal to the index of slide 1.

The incident beam F1 is directed towards the interface between face 1 and liquid crystal 3 so that the plane of incidence of beam F1 on the interface is perpendicular to the orientation of the molecules in contact with slide 1.

Polarization P, parallel to the plane of incidence, encounters a dioptric system in which the emerging ray index is the liquid crystal ordinary index; if the angle of incidence exceeds Arcsine ($n_o/n$) (where n is the glass index and $n_o$ the liquid crystal index), total reflection occurs and polarization P is retained.

Polarization S, perpendicular to the plane of incidence, encounters a cliopirie system in which the index of the emerging ray is the liquid crystal extraordinary index; this index is almost invariably greater than the ordinary index and we shall consider the case where it equals the glass index: i.e. $n_e = n$. This polarization penetrates the liquid crystal without undergoing any reflection, even partial, at the interface.

Polarization S propagates through the liquid crystal at a highly oblique angle of incidence and is rotated due to the rotation of the liquid crystal directrix. In practice, the cell is a few microns thick and the rotation pitch is large compared to the wavelengths of the light; the Mauguin condition is satisfied and the polarization rotates with the directrix. The light emerges from the liquid crystal with polarization P; the index at the interface is very close to $n_e$ and very little light is reflected. For example, if the indices are 1.5/1.65, the minimum index is Arcsine $(1.5/1.65)=65°$; upon emerging from the liquid crystal, the angle incidence is increased by approximately 2° and the directrix is seen at an angle of 23°; the index obeys a law of the type $n_e\sin2(i)+n_o\cos^2(i)$ and is approximately 1.62. At this incidence, only approximately 0.1% of a wave with polarization P will be reflected at a 1.62/1.65-index interface.

As is seen in FIG. 2, the light in beam F1 which is polarized in direction S parallel to the molecules in contact with slide 1 (and therefore perpendicular to the plane of incidence of beam F1) is not deviated at the interface between slide 1 and the liquid crystal. The polarization of this light is then rotated as it propagates through the liquid crystal and the emerging beam F3 is polarized parallel to the molecule in contact with slide 2, i.e. parallel to a plane perpendicular to slide 2. In other words, beam F3 is polarized parallel to the incident beam.

The light in beam F1 polarized in direction P, parallel to the plane of incidence, is reflected as a beam F2 with the same polarization.

It should be noted that the optical path through the liquid crystal $\Delta$ n.e must be very large compared to half the beam wavelength and this requirement is satisfied when the beam has a high index angle i.

We shall now describe a method of constructing a display device according to the invention.

FIG. 4a represents an assembly of a source 6, an elliptical collector 7 and the separator device SP. The relative sizes of source 6 and the liquid crystal layer 3 are expressed in terms of their geometrical dimensions in the plane of incidence:

for the source: $E=2\pi L$ (see FIG. 4b)
for layer 3: $E'=(nL'\cos(i)di)$ from $i_{min}$ to 90° (for example, $E'=0.8$ L' for indices 1.5/1.65) (see FIG. 4c).

In practice, the surface acceptance as a function of aperture for the device differs from that for the source and it is preferable to choose a slide length between 10 and 30 times the size of the source (for example 20 times) to ensure all the rays emitted by the source are collected.

The aperture in a plane perpendicular to the plane of incidence is only limited by the angle at which the ray entering the separator "sees" the liquid crystal directrix. This is only a slight limitation and the angle of acceptance is close to $\pi$ in air.

Figure 5:
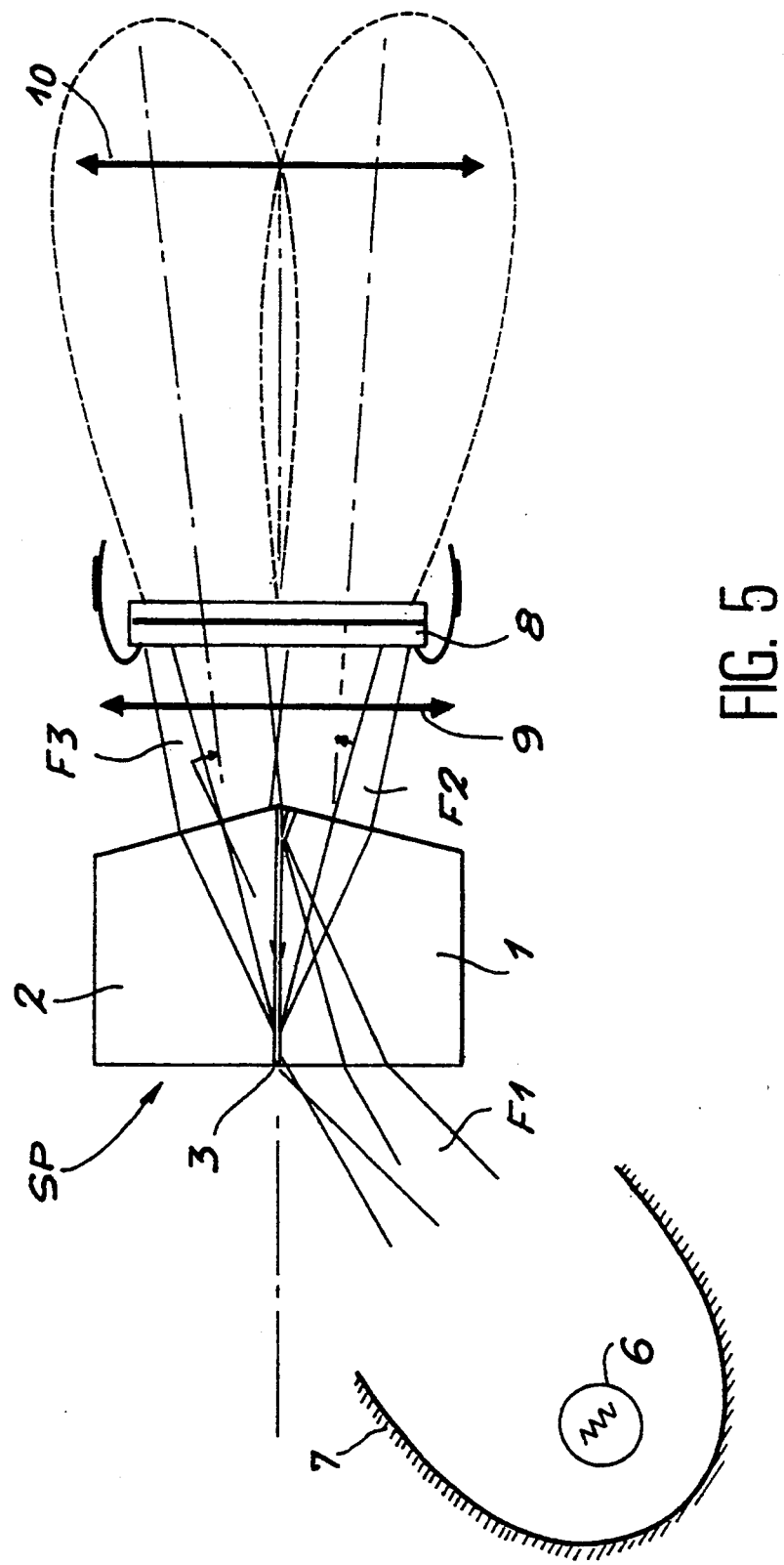
FIG. 5 represents another example of a display system according to the invention.

FIG. 5 represents a practical version of a projector embodying the system according to the invention. It shows the separator SP, the source 6 and the reflector 7. Beams F2 and F3 output by the separator SP illuminate a light modulating screen 8.

This light modulator can be an electro-optical screen such as, for example, a liquid crystal screen.

The fact that the polarization through separator SP is retrieved very efficiently means that this polarization can be used to illuminate one half of this image without causing color discrepancies perceptible to the viewer.

However, because the superficial acceptance of device 8 is zero on the center line ($i=90°$, $\cos(i)=0$), an outlet prism is included to ensure the two half-beams converge and thus illuminate any dark line in the center of the image. FIG. 4 also shows the exit face from the two slides cut to form a bevel so that they act as a prism and thus allow the two lobes of the two output beams to overlap. However, any other device capable of deflecting the beams leaving separator SP could be used to bring the two lobes which illuminate screen 8 together.

In addition, FIG. 5 shows a focusing lens between the source and the separator SP and an outlet lens (objective) at the outlet from the projection system.

The system illustrated by FIG. 4 has been described as a projection system. However, still according to the invention, it could be adapted to operate as a direct viewer.

Obviously, the above description is only an example and many other variants, still according to the invention, are possible. In particular, the numerical values are only example to illustrate the description.

What is claimed is:

1. An optical polarization separator in which an incident light beam containing a P polarization and S polarization is received wherein said P polarization is reflected and said S polarization is transmitted, said separator comprising a nematic liquid crystal element trapped between a first transparent slide and a second transparent slide, one face of said first slide being in contact with the liquid crystal element so that the liquid crystal molecules in contact with the said one face of said first slide are parallel to said one face of said first slide, one face of the second slide being in contact with the liquid crystal element so that the liquid crystal molecules are oriented perpendicular to said one face of said second slide, wherein said liquid crystal element has a directrix which rotates said S polarization when said S polarization propagates through said liquid crystal element.

2. A polarization separator as claimed in claim 1 in which the liquid crystal molecules in contact with said one face of said first slide are perpendicular to a plane of incidence of a light beam to be processed.

3. A polarization separator as claimed in claim 1 wherein said liquid crystal element has a first index of refraction substantially equal to the index of the material in the first slide when said p Polarization of said light beam is processed and said liquid crystal element has a second index of refraction substantially different from the index of refraction in the first slide when said S polarization of said light beam is processed.

4. A polarization separator as claimed in claim 1 in which a beam to be processed enters the separator via the slide which has one face treated so that the liquid crystal molecules are oriented parallel to this face.

5. A display system comprising:
an optical polarization separator including a nematic liquid crystal element trapped between the first transparent slide and the second transparent slide, one face of said first slide in contact with the liquid crystal element so that the liquid crystal molecules in contact with said one face are parallel to said one face, one face of the second slide in contact with the liquid crystal element so that the liquid crystal molecules are oriented perpendicular to said one face of said second slide;
a light source producing a beam of unpolarized light applied to said polarization separator said beam containing a P polarization and a S polarization wherein said P polarization is reflected and said S polarization is transmitted in order to provide two beams of polarized light polarized in the same direction wherein said liquid crystal element has a directrix which rotates said S polarization;

a light modulator to which the beams of polarized light are applied and which modulates the intensity of said two beams of polarized light.

6. A display system of claim 5 in which each of the polarized light beams more or less illuminate one half of the light modulator.

7. A display system as claimed in claim 5 in which the light modulator is an electro-optical modulator.

8. A display system as claimed in claim 7 in which the electro-optical modulator is a liquid crystal screen.

9. A display system as claimed in claim 8 in which at least one of the outlet faces of the separator slides is beveled to act as a deflecting prism.

10. A display system as claimed in claim 5 which includes, between the separator and the light modulator, deflection devices to bring the two beams emerging from the separator together.

* * * * *